United States Patent [19]

Balzer

[11] 4,033,631

[45] July 5, 1977

[54] BRAKE CONTROL MECHANISM

[75] Inventor: David John Balzer, East Peoria, Ill.

[73] Assignee: Caterpillar Tractor Co., Peoria, Ill.

[22] Filed: Nov. 24, 1975

[21] Appl. No.: 634,951

[52] U.S. Cl. ..................................... 303/50; 303/71
[51] Int. Cl.² ......................................... B60T 15/04
[58] Field of Search .................. 303/6 M, 50, 71, 9, 303/13

[56] References Cited

UNITED STATES PATENTS

| | | | |
|---|---|---|---|
| 3,224,815 | 12/1965 | Horowitz | 303/71 |
| 3,759,584 | 9/1973 | Klimek | 303/71 |
| 3,854,559 | 12/1974 | Talak et al. | 303/71 X |

*Primary Examiner*—George E. A. Halvosa

*Attorney, Agent, or Firm*—Phillips, Moore, Weissenberger, Lempio & Majestic

[57] ABSTRACT

A release mechanism for a normally applied, spring-loaded brake includes a valve manually operable by a control cable to direct pressurized fluid from a residual source to the brake to release it. The valve includes pump device whereby further operation of the control cable will pressurize residual fluid in the valve to release the brake if system fluid pressure is lost. The valve is below sump oil level so that it is always flooded with oil. This supplies fluid to the valve pump device during loss of system pressure and also allows for bleeding the brake release mechanism by siphoning action whenever the valve is operated.

7 Claims, 2 Drawing Figures

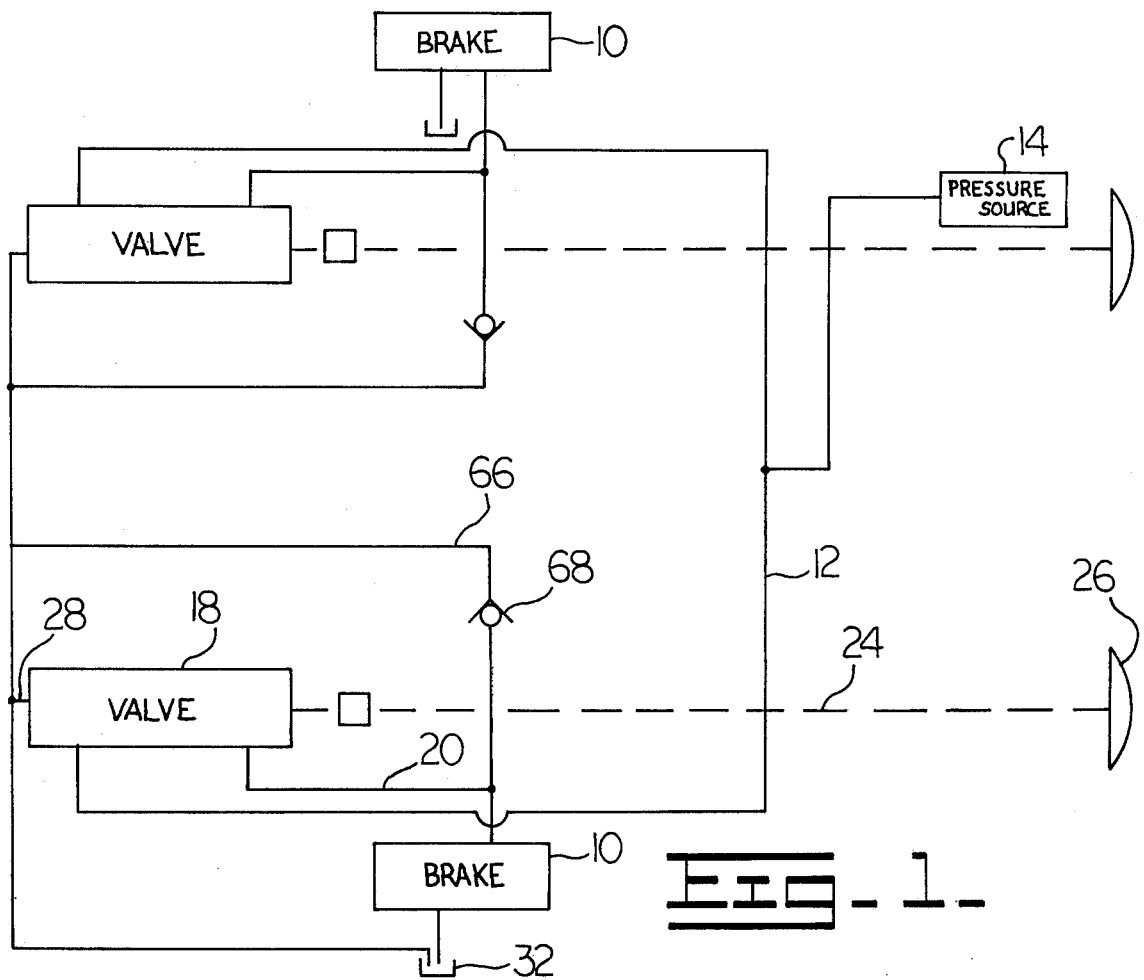
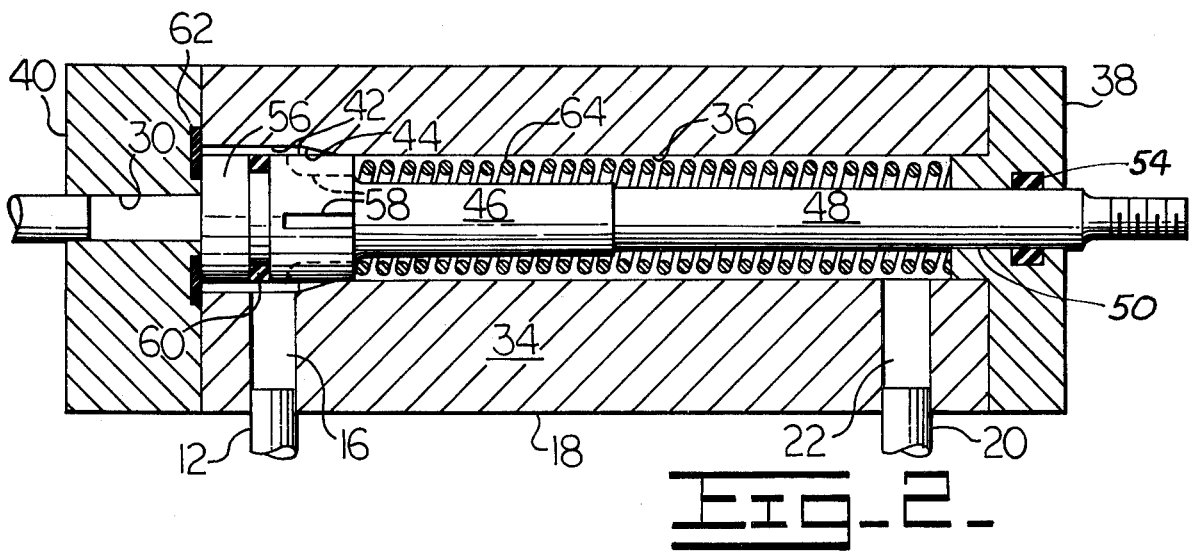

BRAKE CONTROL MECHANISM

BACKGROUND OF THE INVENTION

This invention relates to vehicles which have brakes which are normally applied by spring pressure, and are releasable by hydraulic pressure. In such vehicles failure of the power plant or related systems such as the hydraulic system, can prevent hydraulic release of the normally applied brakes, which in turn will prevent towing of the vehicle to repair facilities for servicing.

Prior art devices, such as that shown in U.S. Pat. No. 3,744,331, provide means for disconnecting the final drive train between the brake and the traction gear to allow towing. However such devices have the disadvantage of rendering the brake unavailable for use during the towing operation.

THE SUMMARY OF THE INVENTION

It is therefore an object of the present invention to provide a mechanism for hydraulically releasing normally applied brakes to allow for towing or other movement of a vehicle upon failure of the vehicle power plant or hydraulic system, without completely disabling the brake.

This objective is achieved by communicating system hydraulic pressure to the vehicle brake through a valve which is manually controllable from the vehicle operator's station to selectively communicate hydraulic system pressure to the brake. The valve spool and bore cooperate to form a piston to trap fluid within the valve bore and pump it to the brake upon extended actuation of the valve spool by the vehicle operator to release the brake during total failure of the vehicle hydraulic system. The valve is located below sump fluid level so that it is continually supplied with hydraulic fluid. However this feature also allows for purging the brake release mechanism of air upon actuation of the valve.

Accordingly the brake control mechanism of the present invention provides a simple means for releasing the vehicle brakes upon failure of normal brake release systems, either by utilizing residual hydraulic system pressure, or by manually pumping fluid to the brakes.

The brake control mechanism of the present invention is contemplated for use of vehicles wherein traction gear on each side of the vehicle is driven independently and has a brake associated therewith. Accordingly a brake control mechanism is provided for each brake, allowing for steering of the vehicle during towing by selective releasing of the brakes.

BRIEF DESCRIPTION OF DRAWINGS

FIG. 1 is a schematic drawing of the brake control mechanism of the present invention installed in a vehicle having two brakes and controls.

FIG. 2 is a sectional view of the valve shown in FIG. 1

DESCRIPTION OF THE PREFERRED EMBODIMENT

Referring to FIG. 1, a schematic brake system embodying the present invention is shown as used on a vehicle having normally applied brakes and arranged to brake traction gear on the respective sides of a vehicle. A separate brake control mechanism is employed for each brake so that each vehicle traction gear may be controlled independently. A brake control mechanism embodying the present invention and employed in connection with a brake 10 will be described hereinafter, but it is to be understood that two such mechanisms would normally be employed on a vehicle to control the brakes on each side of the vehicle.

A pressure line 12 is arranged to communicate pressurized hydraulic fluid from a pressure source 14 in the vehicle hydraulic system to an inlet port 16 in a control valve 18. A brake line 20 communicates an outlet port 22 in control valve 18 with brake 10 to supply hydraulic pressure to the brake for release thereof. Brake 10 is of the normally applied type where spring compression maintains the brake in an "on" configuration unless released by pressurized hydraulic fluid communicated to the brake. Such brake mechanisms are well-known in the art and will not be further described.

A control cable 24 extends from a control handle 26 located in the vehicle operator's station, to valve 18 for control thereof by the vehicle operator. A return line 28 communicates an exhaust port 30 in valve 18 with sump 32 of the vehicle hydraulic system.

Referring to FIG. 2, valve 18 includes a valve body 34 having a main bore 36 extending longitudinally therein which is terminated on one end by a cap 38 and on the other end by an enlarged bore 42 which is closed by a cap 40 having exhaust port 30 formed therein. Valve bore 36 communicates with port 22, and enlarged bore 42 is in communication with ports 16 and 30, and is joined to bore 36 by a conical surface 44.

Disposed within bore 36 is a valve spool 46 which includes a stem 48 which extends through a bore 50 in cap 38 and terminates in a suitable fitting for engagement by the end of control cable 24. A seal 54 disposed in a groove in cap 38 engages stem 48 to prevent escape of fluid from bore 36.

Spool 46 also includes a land 56 disposed within enlarged valve bore 42 and extending into bore 36. Slots 58 are provided in a portion of land 56 to provide communication between bores 42 and 36 when spool 46 is in the position shown. An O ring 60 disposed in land 56 leftward of slot 58 is adopted to engage bore 36 in sealing engagement therewith upon rightward movement of spool 46 under the force of control cable 24.

Spool 46 is biased against a seal 62 disposed in cap 40, by a compressive spring 64. In this configuration pressurized fluid from line 12 is supplied to inlet port 16 and then to bore 42 through slots 58 to bore 36 and outlet port 22 and through brake line 22 to release brake 10. Upon unseating of spool 46 from seal 62 by means of control handle 26 through control cable 24, pressurized fluid from inlet port 16 is allowed to exit through exhaust port 30 to the sump, preventing pressurization and release of brake 10.

Upon further movement of valve spool 46 rightward by means of control handle 26 and cable 24, slots 58 will move out of communication with bore 42 and O ring 60 will seal off bore 36, trapping fluid in bore 36 and outlet port 22. The fluid trapped in bore 36 may now be pumped into line 20 and brake 10 by further movement of spool 46 against spring 64 upon further manipulation of handle 26 and cable 24, pressurizing fluid in brake 10 for release thereof upon failure of pressure in pressure line 12.

Valve 18 and lines 20, 12 and 28 are all below sump fluid level. Thus line 28, exhaust port 30, and bore 42, upon unseating of spool 46 from seal 62, will be flooded with hydraulic fluid at all times. Therefore loss of fluid past O ring 60 or in the brakes during pumping of the valve as described above can be replenished by allowing spool 46 to return under the urging of spring 64 until slot 58 again communicates with bore 42 whereupon bore 36 will be replenished with sump oil.

Since valve 18 is below the fluid level of the sump, any air in valve 18 will be purged upon opening of exhaust port 30 by spool 46. Air in brake line 20 will also be bled at this time by siphoning action of fluid flowing from line 12 to exhaust port 30. Fluid is resupplied to the brake and brake line 20 through a supply line 66 and check valve 68.

While the invention has been described and shown with particular reference to the preferred embodiment, it will be apparent that variations might be possible that fall within the scope of the present invention and which is not intended to be limited except as defined in the following claims.

What is claimed is:

1. In a vehicle having a pressurized hydraulic system including a sump and a normally applied brake releasable by hydraulic pressure, a brake release mechanism comprising, a valve conduit means for communicating hydraulic fluid from a pressure source in the vehicle hydraulic system to said valve, brake conduit means for communicating fluid from the valve to the vehicle brake, exhaust conduit means for communicating fluid in the valve with the vehicle hydraulic system sump, and a single control means for selectively operating the valve from a remote location on the vehicle, wherein the valve comprises a valve body, a main bore provided in the valve body, an enlarged bore provided in the valve body at one end of the main bore, caps closing the ends of the main bore and the enlarged bore respectively, a spool slidably disposed within the main and enlarged bores having a stem portion extending through the cap closing the main bore and engaged by the control means, and a land portion disposed within the enlarged bore and adapted to abut the cap closing said enlarged bore, an exhaust port provided in said cap, seal means for sealing the exhaust port upon abutment of said cap by the land portion, spring means biasing the valve spool land portion against the seal means of the exhaust port so that it normally closes the exhaust port, an inlet port communicating with the enlarged bore, and an outlet port communicating the main bore and with the brake conduit means and slot means for communicating the enlarged bore and inlet port with the main bore and outlet port while the valve spool closed the exhaust port, whereby the valve is operable by said control means to selectively communicate the pressure conduit means with the brake conduit means to release the vehicle brake, or with the exhaust conduit means to allow application of the normally applied brake, or to pressurize fluid in the valve and brake conduit in response to said control means to release the brake when pressurized hydraulic fluid is not available in the pressure conduit means.

2. The mechanism defined in claim 1 wherein said slot means for communicating the enlarged bore and the main bore will maintain such communication upon opening of the exhaust port by limited sliding of the valve spool whereby upon flow of fluid from the inlet port to the exhaust port said slot means will allow syphoning from the main bore, outlet port, brake conduit and brake to purge any air therein.

3. The mechanism defined in claim 2 further comprising a supply conduit for supplying hydraulic fluid from the hydraulic system sump directly to the brake conduit to supply fluid to the brake conduit and brake during syphoning, and wherein the valve means is below the hydraulic system sump whereby air may be bled from the brake conduit and brake.

4. The mechanism defined in claim 2 wherein the slot means for communicating the enlarged bore with the main bore will be sealingly closed upon further sliding of the spool in response to further operation of the control means, to trap and pressurize fluid in the main bore, brake conduit and brake upon such further sliding of the spool, whereby the brake may be released in the absence of fluid pressure at the inlet port and enlarged bore.

5. The brake control mechanism defined in claim 1 wherein the control means comprises, a control handle located at the operator's station of the vehicle, and a control cable connected to the control handle and the stem of the valve spool whereby sliding of the valve spool within the valve may be controlled by means of the control handle.

6. In a vehicle having a pressurized hydraulic system including a pressure source, a sump, and a normally applied brake releasable by hydraulic pressure, an auxiliary brake release mechanism comprising, a conduit for communicating hydraulic fluid from the pressure source to the brake for release thereof, a single valve disposed in the conduit and including means for normally allowing pressurization fluid for the brakes to flow through said conduit and said valve, and a single manual control means for selectively activating the valve, and wherein said valve is selectably operable to exhaust brake operating fluid to sump upon limited actuation thereof in one direction, or to pump fluid from sump to pressurize the brake upon further actuation thereof in said one direction.

7. The release mechanism of claim 6 wherein said valve comprises a valve body, a main bore in said body, an enlarged bore in said body coaxial with and at one end of said main bore, a conical seating surface joining the main bore and the enlarged bore, a cap closing the enlarged bore, an exhaust port provided in said cap, an inlet port communicating with the enlarged bore, an outlet port communicating with the main bore, a spool disposed in the main bore and enlarged bore and having a land portion disposed in the enlarged bore and extending into the main bore, spring means for biasing the spool and land portion against the cap whereby the land portion will close the exhaust port, slot means provided in the land portion for communicating fluid from the enlarged bore to the main bore when the spool is biased against the cap, annular seal means provided in the land portion and adapted for sealing engagement with the main bore, and manual control means for selectively sliding the valve spool in the bores, whereby when the spool is normally biased against the cap brake release pressure will be communicated from the inlet port to the enlarged bore, through the slot means in the land portion to the main bore, and out the outlet port to the brake for release thereof, and upon limited sliding of the spool away from the cap release fluid will be vented through the exhaust port to sump, and upon further sliding of the spool away from the cap the slot means will no longer communicate the enlarged bore with the main bore, and the annular seal will cooperate with the main bore walls to seal the main bore so that upon further sliding of the spool fluid trapped in the main bore will be pumped to the brake for release thereof.

* * * * *